US010271025B2

(12) United States Patent
Maeda (10) Patent No.: US 10,271,025 B2
(45) Date of Patent: Apr. 23, 2019

(54) COLOR SEPARATING AND COMBINING SYSTEM AND PROJECTING DISPLAY APPARATUS INCLUDING THE SAME

(71) Applicant: CANON KABUSHIKI KAISHA, Tokyo (JP)

(72) Inventor: Yuuki Maeda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 617 days.

(21) Appl. No.: 14/842,096

(22) Filed: Sep. 1, 2015

(65) Prior Publication Data
US 2016/0065918 A1 Mar. 3, 2016

(30) Foreign Application Priority Data

Sep. 3, 2014 (JP) ................................ 2014-179326

(51) Int. Cl.
*H04N 9/31* (2006.01)
*G02B 27/28* (2006.01)
*G02F 1/1335* (2006.01)

(52) U.S. Cl.
CPC ......... *H04N 9/3105* (2013.01); *G02B 27/283* (2013.01); *H04N 9/315* (2013.01); *H04N 9/3158* (2013.01); *H04N 9/3167* (2013.01)

(58) Field of Classification Search
CPC ..... H04N 9/3105; H04N 9/315; G02B 27/283
USPC .......................................................... 349/9
See application file for complete search history.

(56) References Cited

U.S. PATENT DOCUMENTS

| 6,067,193 | A | * | 5/2000 | Sekine | ................. | G02B 27/283 |
| | | | | | | 349/5 |
| 6,212,013 | B1 | | 4/2001 | Kodama et al. | | |
| 6,478,430 | B2 | | 11/2002 | Wada | | |
| 6,611,381 | B2 | | 8/2003 | Kodama et al. | | |
| 6,783,244 | B1 | | 8/2004 | Okuyama et al. | | |
| 7,023,602 | B2 | * | 4/2006 | Aastuen | ................. | G02B 5/305 |
| | | | | | | 348/E9.027 |
| 7,044,608 | B2 | | 5/2006 | Okuyama et al. | | |
| 7,499,111 | B2 | | 3/2009 | Hirata et al. | | |
| 8,025,409 | B2 | | 9/2011 | Kawamura et al. | | |

(Continued)

FOREIGN PATENT DOCUMENTS

JP 11-174371 A 7/1999
JP 11-202432 A 7/1999
(Continued)

*Primary Examiner* — Lucy P Chien
(74) *Attorney, Agent, or Firm* — Canon U.S.A., Inc. I.P. Division (57) ABSTRACT

At least one color separating and combining system includes a light combining element, such as a cross dichroic prism, a dichroic mirror that transmits a first (e.g., blue) light, and a first PBS that guides the blue light to a first liquid crystal panel. The system may include a wavelength selective PBS that guides a green light to a second liquid crystal panel and that guides a red light to a direction different from that of the second liquid crystal panel. The system may include a relay optical system, a second PBS that guides the red light to a third liquid crystal panel, and a trimming filter that transmits the green light and reflects the red light. The relay optical system may be disposed between the wavelength selective PBS and the second PBS. The trimming filter may be disposed between the wavelength selective PBS and the cross dichroic prism.

16 Claims, 4 Drawing Sheets

(56) References Cited

U.S. PATENT DOCUMENTS

| | | | |
|---|---|---|---|
| 8,246,177 B2 | 8/2012 | Maeda | |
| 2003/0147051 A1* | 8/2003 | Fujita | H04N 9/3105 353/31 |
| 2005/0157265 A1 | 7/2005 | Florence et al. | |
| 2010/0330350 A1* | 12/2010 | Osada | B32B 27/36 428/213 |

FOREIGN PATENT DOCUMENTS

| | | | |
|---|---|---|---|
| JP | 11-281947 | A | 10/1999 |
| JP | 2000-275730 | A | 10/2000 |
| JP | 2005-208256 | A | 8/2005 |
| JP | 2006-209061 | A | 8/2006 |
| JP | 2008-292862 | A | 12/2008 |
| JP | 2009-008808 | A | 1/2009 |
| JP | 2009-229475 | A | 10/2009 |
| JP | 2011-209396 | A | 10/2011 |

\* cited by examiner

COLOR SEPARATING AND COMBINING SYSTEM AND PROJECTING DISPLAY APPARATUS INCLUDING THE SAME

BACKGROUND OF THE INVENTION

Field of the Invention

The present disclosure relates to at least one color separating and combining system and at least one projecting display apparatus such as a projector. In one or more embodiments, the present disclosure relates to at least one projector including a reflective liquid crystal panel.

Description of the Related Art

A color separating and combining system has been developed in recent years which separates a white light beam emitted from a mercury-vapor lamp into a red light, a green light, and a blue light, guides the lights to reflective liquid crystal panels through separate optical paths, and combines the lights with a combining prism.

An example of the configuration of such a color separating and combining system and a projector including the same is disclosed in Japanese Patent Laid-Open No. 2011-209396.

Japanese Patent Laid-Open No. 2011-209396 discloses a technique for introducing a blue light and a green light to a single polarizing beam splitter (PBS). To prevent a plurality of color lights from entering a single PBS, an optical system for bending the optical paths of predetermined color lights was needed. However, the technique disclosed in Japanese Patent Laid-Open No. 2011-209396 eliminates the need for such an optical system, allowing a more compact color separating and combining system than ever.

SUMMARY OF THE INVENTION

A color separating and combining system according to an aspect of the present disclosure is a color separating and combining system that guides a first color light, a second color light, and a third color light having different wavelengths from each other to different optical paths from each other and combines the color lights. The system includes a light combining element, a first color separation element, a first polarization separation element, a second polarization separation element, a relay optical system, a third polarization separation element, and a second color separation element. The light combining element combines the first color light, the second color light, and the third color light. The first color separation element guides the first color light to a direction different from directions of the second color light and the third color light. The first polarization separation element guides the first color light from the first color separation element to a first light modulating element and guides the first color light modulated by the first light modulating element to the light combining element. The second polarization separation element guides, of the second color light and the third color light from the first color separation element, the second color light to a second light modulating element, guides the third color light to a direction different from a direction of the second light modulating element, and guides the second color light modulated by the second light modulating element to the light combining element. The third polarization separation element guides the third color light from the relay optical system to a third light modulating element and guides the third color light modulated by the third light modulating element to the light combining element. The second color separation element transmits the second color light from the second polarization separation element and reflects the third color light. The first light modulating element, the second light modulating element, and the third light modulating element are reflective liquid crystal panels. The relay optical system is disposed between the second polarization separation element and the third polarization separation element, and operates to receive the third color light from the second polarization separation element. The second color separation element is disposed between the second polarization separation element and the light combining element.

According to other aspects of the present disclosure, one or more additional color separating and combining systems and one or more projecting display apparatuses including a color separating and combining system are discussed herein. Further features of the present disclosure will become apparent from the following description of exemplary embodiments with reference to the attached drawings.

DESCRIPTION OF THE EMBODIMENTS

It is difficult to split light as completely desired with an optical element that splits light depending on the wavelength or the polarizing direction, such as a dichroic mirror and a PBS. If P-polarized light is incident on a PBS that transmits P-polarized light and reflects S-polarized light, not the whole of the incident light passes through the PBS, but part thereof is reflected by the PBS to an optical path different from a desired optical path to become leakage light. This causes a phenomenon in which the leakage light is projected onto a screen to degrade the contrast, although a black image, for example, is to be displayed.

The configuration disclosed in Japanese Patent Laid-Open No. 2011-209396 achieves a more compact color separating and combining system than ever. However, in displaying a black image, part of P-polarized blue light that has returned to a PBS without being modulated by a reflective liquid crystal panel can be reflected by the PBS. This may cause the P-polarized blue light reflected by the PBS to pass through a cross dichroic prism and be displayed on the screen.

In other words, this can degrade the contrast due to the leakage light.

The present disclosure provides a color separating and combining system in which the effect of leakage light can be reduced and a projecting display apparatus including the same.

Embodiments of the present disclosure will be described hereinbelow by way of example with reference to the drawings. The relative disposition of components described in the embodiments may be changed as appropriate depending on the configuration incorporating an embodiment and various conditions. That is, the relative positions of the components are not defined to limit the scope of the disclosure to the following embodiments.

First Embodiment

Figure 1:
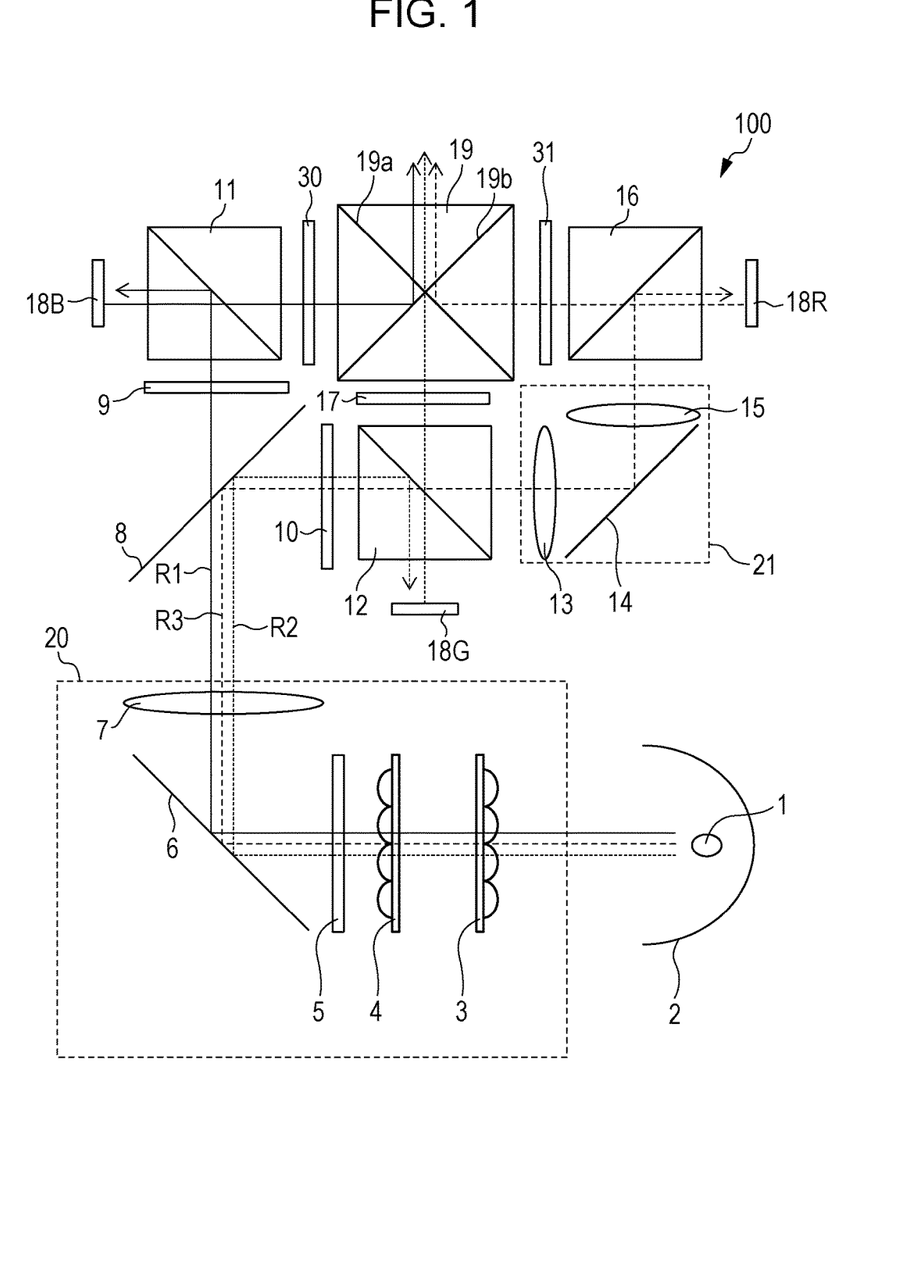
FIG. 1 is a diagram showing the configuration of an optical system according to a first embodiment.
Figure 2:
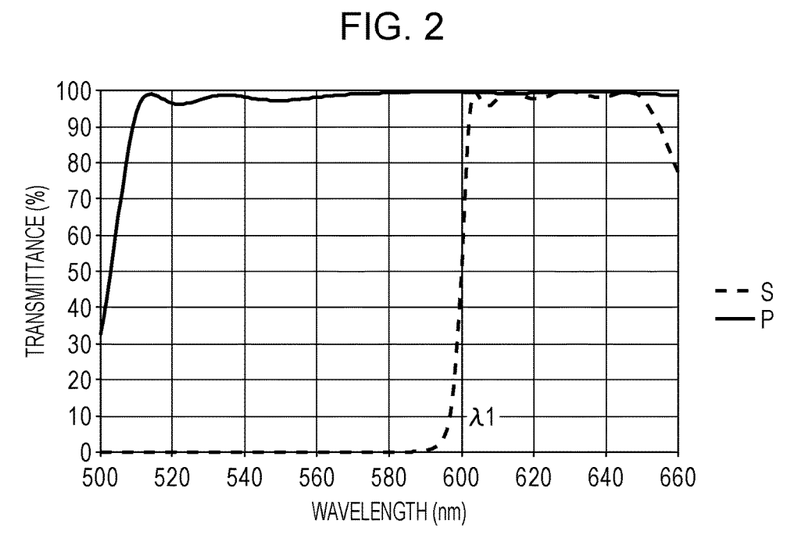
FIG. 2 is a graph showing the property of a wavelength selective polarizing beam splitter according to the first embodiment.
Figure 3:
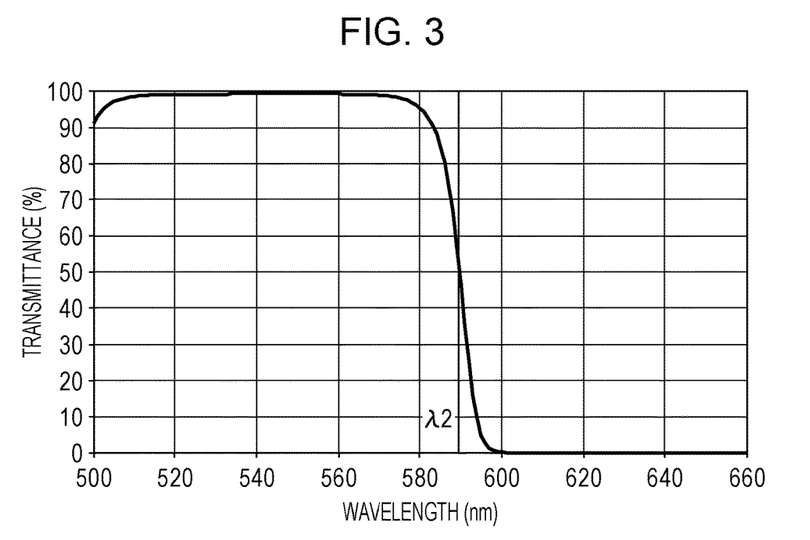
FIG. 3 is a graph showing the property of a trimming filter according to the first embodiment.

Referring to FIGS. 1 to 3, the configuration of a color separating and combining system according to a first embodiment and a projector (a projecting display apparatus) 100 including the same will be described.

FIG. 1 is a diagram showing the configuration of a color separating and combining system according to the first embodiment and the projector 100 including the same.

First, the configuration of a light source unit will be described.

Light radiated from a light-emitting tube 1, such as a high-pressure mercury electric discharge tube, is converted to a collimated light beam by a parabolic reflector 2. The light-emitting tube 1 and the parabolic reflector 2 constitute the light source unit.

Next, the configuration of an illumination optical system 20 will be described.

The collimated light beam from the parabolic reflector 2 is split into a plurality of partial light beams by a first fly-eye lens 3. The plurality of partial light beams condense in the vicinity of the lens cells of a second fly-eye lens 4 to form a light source image.

The light beams from the second fly-eye lens 4 are converted to S-polarized light by a polarization conversion element 5 and illuminate reflective liquid crystal panels (light modulating elements) 18 (18R, 18G, 18B) in a superimposed manner via a first mirror 6 and a condenser lens 7. The polarization conversion element 5 includes a plurality of polarized-beam separation surfaces, a plurality of reflective surfaces, and a plurality of ½ waveplates.

The S-polarized light is polarized light vibrating in a direction perpendicular to a principal plane, which is a plane parallel to a normal to the polarized-beam separation surface of the polarization conversion element 5 and the traveling direction of the light beams from the second fly-eye lens 4. In contrast, the P-polarized light is polarized light vibrating in a direction parallel to the principal plane.

The first fly-eye lens 3 to the condenser lens 7 constitute the illumination optical system 20.

Next, the configuration of the color separating and combining system will be described.

The reflective liquid-crystal panel for red light (a third light modulating element) 18R, the reflective liquid-crystal panel for green light (a second light modulating element) 18G, and the reflective liquid-crystal panel for blue light (a first light modulating element) 18B reflect incident light and modulate the incident light.

A dichroic mirror (a first color separation element) 8 reflects blue light (a first color light, light in a blue wavelength band) R1 and reflects green light (a second color light, light in a green wavelength band) R2 and red light (a third color light, light in a red wavelength band) R3. In other words, the dichroic mirror 8 guides the blue light R1 to a direction different from those of the green light R2 and the red light R3.

A first polarizer 9 and a second polarizer 10 transmit S-polarized light and reflect P-polarized light. The first polarizer 9 is disposed between the dichroic mirror 8 and a first PBS 11, described later. The second polarizer 10 is disposed between the dichroic mirror 8 and a wavelength selective PBS 12, described later.

The first PBS (a first optical-path conversion element) 11 reflects S-polarized light and transmits P-polarized light. The first PBS 11 also serves as a first polarization separation element that guides the blue light R1 from the dichroic mirror 8 to the liquid crystal panel 18B (a first light modulating element) and guides the blue light R1 modulated by the liquid crystal panel 18B to a cross dichroic prism 19, described later.

The wavelength selective PBS (a second optical-path conversion element) 12 reflects S-polarized light of the green light R2 and transmits P-polarized light, and transmits red light R3. The wavelength selective PBS 12 serves also as a second polarization separation element that guides the green light R2 of the green light R2 and the red light R3 from the dichroic mirror 8 to the liquid crystal panel 18G. The wavelength selective PBS 12 serves also as a second polarization separation element that guides the red light R3 in a direction different from that of the liquid crystal panel 18G and guides the green light R2 modulated by the liquid crystal panel 18G to the cross dichroic prism 19.

The property of the wavelength selective PBS 12 is shown in FIG. 2. The wavelength selective PBS 12 acts as a PBS for green light with a wavelength of about 510 nm to 580 nm and does not act as a PBS for red light with a wavelength of about 600 nm to 650 nm. In other words, the wavelength selective PBS 12 transmits one of the two color lights incident on the wavelength selective PBS 12 and reflects the other on the basis of the wavelengths of the two color lights, and transmits one of P-polarized light and S-polarized light and reflects the other. The solid line in FIG. 2 indicates the property of P-polarized light, and the broken line in FIG. 2 indicates the property of S-polarized light.

The wavelength selective PBS 12 receives two color lights having different wavelengths; specifically, green light R2 and red light R3. The polarizing directions of the two color lights incident on the wavelength selective PBS 12 are the same. Specifically, both of the green light R2 and the red light R3 are S-polarized light.

A relay optical system 21 reforms an image of red light R3 that has passed through the wavelength selective PBS 12 on the liquid crystal panel 18R. The relay optical system 21 includes a first relay lens 13 having positive power, a second mirror 14, and a second relay lens 15 having positive power. In other words, the relay optical system 21 includes at least one lens having positive power and the second mirror 14 that reflects the red light R3. The second mirror 14 may not be a flat mirror but may be a mirror prism.

A second PBS (a third optical-path conversion element) 16 reflects S-polarized light and transmits P-polarized light. The second PBS 16 also serves as a third polarization separation element that guides red light R3 coming from the relay optical system 21 to the liquid crystal panel 18R and guides the red light R3 modulated by the liquid crystal panel 18R to the cross dichroic prism 19.

A trimming filter (a second color separation element) 17 transmits green light R2 and reflects red light R3. In other words, the trimming filter 17 transmits one of green light R2 and red light R3 and reflects the other. The trimming filter 17 is disposed between the wavelength selective PBS 12 and the cross dichroic prism 19.

The property of the trimming filter 17 is shown in FIG. 3. The trimming filter 17 transmits green light with a wavelength of about 510 nm to 580 nm and reflects red light with a wavelength of 600 nm to 650 nm.

The cross dichroic prism (a light combining element) 19 combines the blue light R1, the green light R2, and the red light R3 modulated by the liquid crystal panels 18. In other words, the cross dichroic prism 19 combines the blue light R1, the green light R2, and the red light R3.

The cross dichroic prism 19 includes a dichroic film 19*a* and a dichroic film 19*b*. The dichroic film 19*a* reflects the red light R3 and transmits the blue light R1 and the green light R2. The dichroic film 19*b* reflects the blue light R1 and transmits the red light R3 and the green light R2.

A ½ waveplate (a third phase plate) 30 converts the polarizing direction of color light coming from the first PBS 11. The ½ waveplate 30 is disposed between the first PBS 11 and the cross dichroic prism 19.

A ½ waveplate (a fourth phase plate) 31 converts the polarizing direction of color light coming from the second PBS 16. The ½ waveplate 31 is disposed between the second PBS 16 and the cross dichroic prism 19.

As described above, the color separating and combining system according to the first embodiment includes the optical elements denoted by reference signs 8 to 12, 16 to 17, 19, and 21. More specifically, the color separating and combining system guides the blue light R1, the green light R2, and the red light R3, which are included in light emitted from a light source, having different wavelengths and exhibiting the same polarization, to different optical paths and combines them.

Next, the optical operations of the blue light R1, the green light R2, and the red light R3 after they have passed through the illumination optical system 20 will be described. First, the optical operation of the blue light R1 will be described.

S-polarized blue light R1 that has passed through the illumination optical system 20 passes through the dichroic mirror 8 and then the first polarizer 9. Although the individual color lights exit from the illumination optical system 20 in a state in which they are converted to S-polarized light by the polarization conversion element 5, as described above, not all the color lights are converted to S-polarized light, and a little P-polarized light remains. The first polarizer 9 disposed between the dichroic mirror 8 and the first PBS 11 reflects the undesired P-polarized light included in the blue light R1, increasing the proportion of the S-polarized light. This prevents degradation of contrast due to an undesired light component.

The S-polarized blue light R1 that has passed through the first polarizer 9 is reflected by the first PBS 11 to illuminate the liquid crystal panel 18B. In displaying a white or color image, the blue light R1 (blue image light) modulated to P-polarized light by the liquid crystal panel 18B passes through the first PBS 11 and the ½ waveplate 30 into S-polarized light. The blue light R1 modulated to S-polarized light passes through the cross dichroic prism 19 and is guided to a screen by a projection lens (not shown).

In displaying a black image, the liquid crystal panel 18B does not modulate the S-polarized blue light R1 and reflects it back to the light source unit.

Next, the optical operation of the green light R2 will be described.

The S-polarized green light R2 that has passed through the illumination optical system 20 is reflected by the dichroic mirror 8 and passes through the second polarizer 10. Like the first polarizer 9, described above, the second polarizer 10 reflects undesired P-polarized light included in the green light R2 and the red light R3 to increase the proportion of S-polarized light.

The S-polarized green light R2 that has passed through the second polarizer 10 is reflected by the wavelength selective PBS 12 to illuminate the liquid crystal panel 18G. In displaying a white or color image, the green light R2 (green image light) modulated in the liquid crystal panel 18G passes through the wavelength selective PBS 12. Thereafter, the green image light passes through the trimming filter 17 and the cross dichroic prism 19 and is guided to the screen by the projection lens (not shown).

In displaying a black image, the liquid crystal panel 18G does not modulate the S-polarized green light R2 and reflects it back to the light source unit.

Next, the optical operation of the red light R3 will be described.

The S-polarized red light R3 that has passed through the illumination optical system 20 is reflected by the dichroic mirror 8 and passes through the second polarizer 10. The S-polarized red light R3 that has passed through the second polarizer 10 passes through the wavelength selective PBS 12.

The S-polarized red light R3 that has passed through the wavelength selective PBS 12 is guided to the second PBS 16 via the relay optical system 21 and is reflected by the second PBS 16 to illuminate the liquid crystal panel 18R. In displaying a white or color image, the red light R1 (red image light) modulated to P-polarized light by the liquid crystal panel 18R passes through the second PBS 16 and the ½ waveplate 31 into S-polarized light. The red light R3 modulated to S-polarized light passes through the cross dichroic prism 19 and is guided to the screen by the projection lens (not shown).

In displaying a black image, the liquid crystal panel 18R does not modulate the S-polarized red light R3 and reflects it back to the light source unit.

In this way, the blue light R1, the green light R2, and the red light R3 can be guided to the screen, on which a color image and a black image can be displayed.

Next, the operation of the trimming filter 17 will be described.

As described above, the S-polarized red light R3 guided from the dichroic mirror 8 to the wavelength selective PBS 12 passes through the wavelength selective PBS 12. However, not the whole of the red light R3 actually passes through the wavelength selective PBS 12 but part of the red light R3 is reflected by the wavelength selective PBS 12 to the liquid crystal panel 18G. This is because P-polarized light generally has high transmittance, and S-polarized light generally has high reflectance. In this way, light desired to be transmitted through an optical element but is actually reflected and light desired to be reflected by an optical element but actually transmitted become leakage light.

In displaying a white or color image, the red light R3 guided to the liquid crystal panel 18G is modulated from S-polarized light to P-polarized light by the liquid crystal panel 18G and enters the wavelength selective PBS 12. Since the wavelength selective PBS 12 transmits red light R3, as described above, the red light R3 guided from the liquid crystal panel 18G to the wavelength selective PBS 12 passes through the wavelength selective PBS 12. Without the trimming filter 17, the P-polarized red light R3 that has passed through the wavelength selective PBS 12 travels to the cross dichroic prism 19.

The P-polarized light has high transmittance, and the S-polarized light has high reflectance, as described above. Therefore, when the P-polarized red light R3 is incident on the cross dichroic prism 19, part of the red light R3 passes through the dichroic film 19*a* and then the dichroic film 19*b* to form an image on the screen.

That is, without the trimming filter 17, red leakage light is displayed on the screen as undesired red light, which may degrade the tint.

As described above, in displaying a black image, the liquid crystal panel 18R does not modulate the S-polarized red light R3 and reflects it back to the light source unit. More specifically, since the red light R3 (red non-image light) that is not modulated by the liquid crystal panel 18R is S-polarized light, it is reflected by the second PBS 16 back to the wavelength selective PBS 12 via the relay optical system 21.

The wavelength selective PBS 12 transmits not the whole of the red light R3 but reflects part of the red light R3 to the cross dichroic prism 19. This is because the wavelength selective PBS 12 transmits light with a wavelength of about 600 nm to 650 nm regardless of the polarizing direction, as shown in FIG. 2, but P-polarized light has high transmittance, and S-polarized light has high reflectance, as described above.

Without the trimming filter 17, the red light R3 (red leakage light) reflected by the wavelength selective PBS 12 passes through the cross dichroic prism 19 and is guided to the screen by the projection lens (not shown).

That is, since red leakage light is displayed on the screen, although a black display is desired, the contrast can be degraded.

The red leakage light generated in displaying a white or color image is P-polarized light having high transmittance, while the red leakage light generated in displaying a black image is S-polarized light having high reflectance. Therefore, the effect of the red leakage light generated in displaying a black image is smaller than the effect of red leakage light generated in displaying a white or color image. However, the red leakage light generated in displaying a black image may be cut with the trimming filter 17.

In one or more embodiments, the trimming filter 17 is disposed between the wavelength selective PBS 12 and the cross dichroic prism 19. This prevents the red leakage light from being guided to the cross dichroic prism 19 and degradation of contrast due to the leakage light.

According to at least one embodiment, a color separating and combining system in which the effect of leakage light is reduced and a projecting display apparatus including the same can be provided.

Furthermore, a simpler color separating and combining system than that with the configuration disclosed in Japanese Patent Laid-Open No. 2011-209396 and a projecting display apparatus including the same can be provided.

More preferable conditions in an embodiment of the present disclosure will be described herein below.

Preferably, Eq. (1) is satisfied:

$$\lambda 1 > \lambda 2 \text{ [nm]} \quad (1)$$

where λ1 is the S-polarized light cut wavelength of the wavelength selective PBS 12, and λ2 is the cut wavelength of the trimming filter 17.

More preferably, Eq. (2) is satisfied:

$$\lambda 1 \geq \lambda 2 + 5 \text{ [nm]} \quad (2)$$

More preferably, Eq. (3) is satisfied:

$$\lambda 1 \geq \lambda 2 + 10 \text{ [nm]} \quad (3)$$

The cut wavelength is the wavelength of a beam whose transmittance in the optical element is 50%, in other words, a wavelength at which the transmittance becomes half.

As shown in FIGS. 2 and 3, in this embodiment, λ1 is 600 nm, and λ2 is 590 nm, which satisfy the above conditions.

When S-polarized light with a wavelength of around λ1, as shown in FIG. 2, exits from the relay optical system 21 and enters the wavelength selective PBS 12, about half of the S-polarized light with a wavelength of around λ1 is reflected by the wavelength selective PBS 12 toward the cross dichroic prism 19. If λ2 is 620 nm, so it does not satisfy the above conditions, the trimming filter 17 cannot sufficiently reflect S-polarized light with a wavelength of around λ1. In other words, if the above conditions are not satisfied, red leakage light, which comes from the wavelength selective PBS 12 and enters the cross dichroic prism 19, can increase.

The configuration of at least one embodiment of the present disclosure satisfies the above conditions so that the red leakage light generated in displaying a black image is cut with the trimming filter 17. Thus, a color separating and combining system in which the effect of leakage light is further reduced and a projecting display apparatus including the same can be provided.

Second Embodiment

Figure 4:
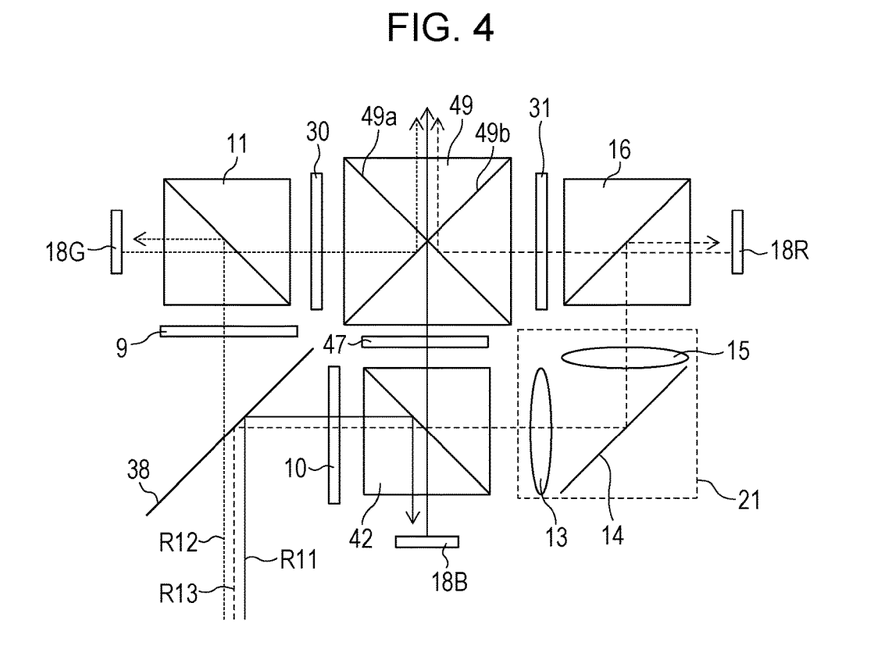
FIG. 4 is a diagram showing the configuration of an optical system according to a second embodiment.

FIG. 4 is a diagram showing the configuration of a color separating and combining system according to a second embodiment and a projector 100 including the same. In FIG. 4, the light source unit and the illumination optical system 20 are omitted, because they have the same configurations as those in the first embodiment.

The second embodiment differs from the first embodiment in that the optical paths of the blue light and the green light are transposed and that the properties of the optical elements are changed correspondingly.

As in the first embodiment, reference sign 18G denotes a reflective liquid-crystal panel for green light, and 18B denotes a reflective liquid-crystal panel for blue light. In this embodiment, however, the positions of the liquid crystal panel 18G and the liquid crystal panel 18B are transposed from those in the first embodiment.

A dichroic mirror 38 therefore transmits green light R12 and reflects blue light R11 and red light R13. A wavelength selective PBS 42 acts as a PBS for the blue light R11 and transmits the red light R13.

Figure 5:
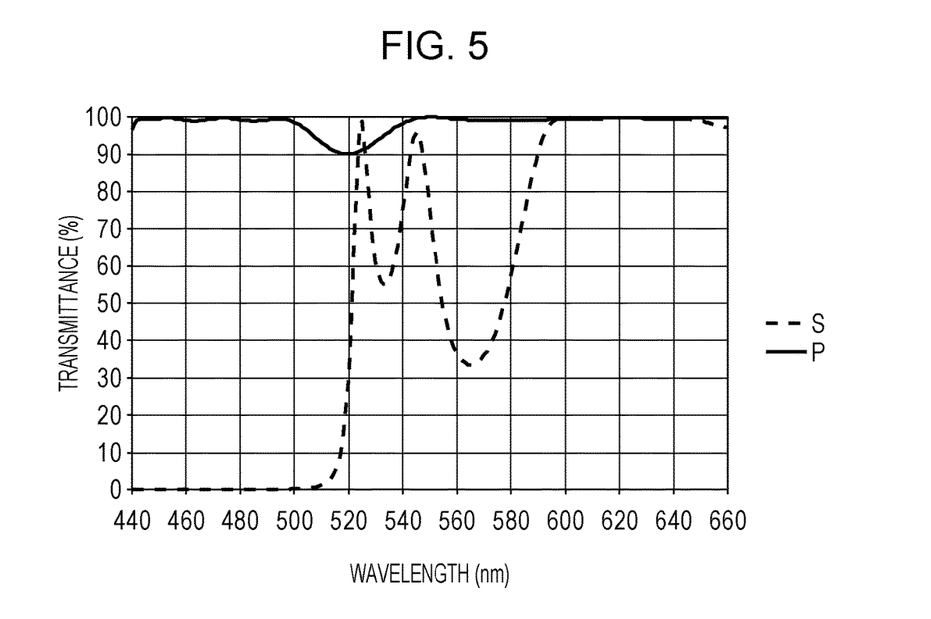
FIG. 5 is a graph showing the property of a wavelength selective polarizing beam splitter according to the second embodiment.

As shown in FIG. 5, the wavelength selective PBS 42 serves as a PBS that transmits P-polarized light and reflects S-polarized light of blue light with a wavelength of about 440 nm to 500 nm and transmits red light with a wavelength of about 600 nm to 650 nm regardless of the polarizing direction. In FIG. 5, the solid line indicates the property of P-polarized light, and the broken line indicates the property of S-polarized light.

The properties of a dichroic film 49a and a dichroic film 49b of a cross dichroic prism 49 also differ from those in the first embodiment. Specifically, the dichroic film 49a reflects the red light R13 and transmits the blue light R11 and the green light R12, and the dichroic film 49b reflects the green light R12 and transmits the blue light R11 and the red light R13.

Optical elements other than the optical elements described above have the same properties as those in the first embodiment.

The optical operations of the blue light R11, the green light R12, and the red light R13 after they have passed through the illumination optical system 20 (not shown) will be described. First, the optical operation of the green light R12 will be described.

The S-polarized green light R12 that has passed through the illumination optical system 20 (not shown) passes through the dichroic mirror 38 and then the first polarizer 9. The effect of the first polarizer 9 is the same as that in the first embodiment.

The S-polarized green light R12 that has passed through the first polarizer 9 is reflected by the first PBS 11 to illuminate the liquid crystal panel 18G. The green light R12 (green image light) modulated to P-polarized light by the liquid crystal panel 18G passes through the first PBS 11 and the ½ waveplate 30 into S-polarized light. The green light R12 modulated to S-polarized light passes through the cross dichroic prism 49 and is guided to a screen by a projection lens (not shown).

Next, the optical operation of the blue light R11 will be described.

The S-polarized blue light R11 that has passed through the illumination optical system 20 (not shown) is reflected by the dichroic mirror 38 and passes through the second polarizer 10. The effect of the second polarizer 10 is the same as that in the first embodiment.

The S-polarized blue light R11 that has passed through the second polarizer 10 is reflected by the wavelength selective PBS 42 to illuminate the liquid crystal panel 18B. The blue light R11 (blue image light) modulated by the liquid crystal panel 18B passes through the wavelength selective PBS 42, a trimming filter 47, and the cross dichroic prism 49 and is guided to the screen by the projection lens (not shown).

The optical operation of the red light R13 and the principle in which degradation of contrast due to red leakage light can be prevented using the trimming filter 47 are the same as those in the first embodiment.

Also in the second embodiment in which the optical paths of the blue light R11 and the green light R12 are transposed from the first embodiment, and the properties of the optical elements are changed correspondingly, a color separating and combining system in which the effect of leakage light is reduced and a projecting display apparatus including the same can be provided.

Third Embodiment

Figure 6:
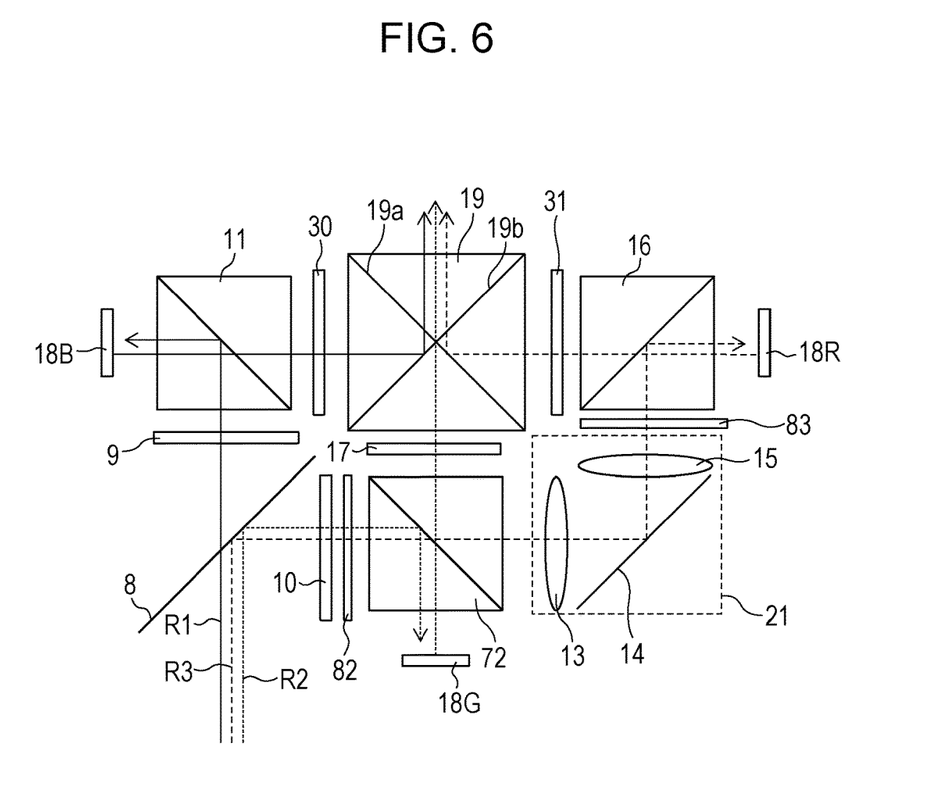
FIG. 6 is a diagram showing the configuration of an optical system according to a third embodiment.

FIG. 6 is a diagram showing the configuration of a color separating and combining system according to a third embodiment and a projector 100 including the same. In FIG. 6, the light source unit and the illumination optical system 20 are omitted, because they have the same configurations as those in the first embodiment.

The third embodiment differs from the first embodiment in that it further includes a wavelength selective ½ waveplate (a first phase plate) 82 and a ½ waveplate (a second phase plate) 83 and includes a third PBS 72 as a second polarization separation element instead of the wavelength selective PBS 12.

The wavelength selective ½ waveplate 82 is disposed between the dichroic mirror 8 and the third PBS 72 and converts the polarizing direction of one of the green light R2 and the red light R3. In other words, the wavelength selective ½ waveplate 82 converts the polarizing direction of only the red light R3 and keeps the polarizing direction of the green light R2.

The ½ waveplate 83 is disposed between the relay optical system 21 and the second PBS 16 and converts the polarizing direction of incident light.

Optical elements other than the optical elements described above have the same properties as those in the first embodiment.

The optical operations of the blue light R1, the green light R2, and the red light R3 after they have passed through the illumination optical system 20 (not shown) will be described. The optical operation of the blue light R1 is the same as that in the first embodiment.

The optical operation of the green light R2 is the same as that in the first embodiment, except that it passes through the wavelength selective ½ waveplate 82 before entering the third PBS 72 after passing through the second polarizer 10. Since the wavelength selective ½ waveplate 82 keeps the polarizing direction of the green light R2, as described above, the green light R2 remains being S-polarized light after passing through the wavelength selective ½ waveplate 82.

Next, the optical operation of the red light R3 will be described. The operation is the same as that in the first embodiment until the red light R3 passes through the second polarizer 10.

The red light R3 that has passed through the second polarizer 10 is incident on the wavelength selective ½ waveplate 82, where it is converted from S-polarized light to P-polarized light. This embodiment therefore differs from the first embodiment in that the red light R3 exiting from the second polarizer 10 is P-polarized light. In other words, in this embodiment, the polarizing directions of two color lights R2 and R3 incident on the third PBS 72 differ. Specifically, the green light R2 is incident on the third PBS 72 in the form of S-polarized light, and the red light R3 is incident on the third PBS 72 in the form of P-polarized light. Unlike the wavelength selective PBS 12, the third PBS 72 is configured to transmit one of P-polarized light and S-polarized light and reflect the other regardless of the wavelengths of the two color lights R2 and R3 incident on the third PBS 72.

The P-polarized red light R3 that has passed through the third PBS 72 is reflected by the relay optical system 21, is converted from P-polarized light to S-polarized light by the ½ waveplate 83, and is incident on the second PBS 16. The subsequent optical operation of the red light R3 until it is guided to the screen is the same as that in the first embodiment.

In this embodiment, the red light R3 that is not modulated but reflected by the liquid crystal panel 18R in displaying a black image is reflected by the second PBS 16, is converted from the S-polarized light to the P-polarized light by the ½ waveplate 83, and is incident on the third PBS 72 while remaining being P-polarized light. However, not the whole of the P-polarized light passes through the third PBS 72, but part of the P-polarized light is reflected by the third PBS 72 toward the cross dichroic prism 19.

Without the trimming filter 17, the P-polarized red light R3 from the third PBS 72 enters the cross dichroic prism 19 as leakage light could pass through the dichroic films 19a and 19b and be displayed on the screen.

In general, P-polarized light has high transmittance, and S-polarized light has high reflectance. For this reason, P-polarized red leakage light that enters the cross dichroic prism 19 from the third PBS 72 (the third embodiment) would degrade the contrast more than the S-polarized red leakage light (the first embodiment) does.

To prevent it, this embodiment is equipped with the trimming filter 17 between the third PBS 72 and the cross dichroic prism 19. This can reduce red leakage light in displaying a black image from being guided to the cross dichroic prism 19, thereby preventing degradation of contrast due to leakage light.

In other words, the main role of the trimming filter 17 in the first embodiment is to cut red leakage light generated in displaying a white image. In contrast, the main role of the trimming filter 17 in the third embodiment is to cut red leakage light generated in displaying a black image.

The first embodiment employs the wavelength selective PBS 12, while the third embodiment employs the third PBS 72 for performing polarization separation regardless of the wavelength. This enables a more simple color separating and combining system than that in the first embodiment and a projecting display apparatus including the same.

Other Embodiments

In the above embodiments, the liquid crystal panel 18R for red light is disposed at a position farthest from the dichroic mirror 8 or 38. This is given for mere illustration and is not intended to limit the present disclosure. Any color separating and combining system in which the effect of leakage light can be reduced and any projecting display apparatus including the same may be provided. For example, the liquid crystal panel 18B for blue light may be disposed at a position farthest from the dichroic mirror 8 or 38. Of course, the properties of the optical elements need to be adjusted to the optical paths of the color lights.

Although the second mirror 14 of the relay optical system 21 in the above embodiments is a flat mirror, this is given for mere illustration and is not intended to limit the present disclosure. Any color separating and combining system in which the effect of leakage light can be reduced and any projecting display apparatus including the same may be provided. For example, the second mirror 14 may be a prism mirror or a spherical mirror to improve aberration.

In the first and third embodiments, the trimming filter 17 is disposed only between the cross dichroic prism 19 and the wavelength selective PBS 12 or the third PBS 72. This is given for mere illustration and is not intended to limit the present disclosure. For example, a second trimming filter that transmits the blue light R1 and reflects the red light R3 and the green light R2 may be provided between the first PBS 11 and the cross dichroic prism 19. Furthermore, a third trimming filter that transmits the red light R3 and reflects the blue light R1 and the green light R2 may be provided between the second PBS 16 and the cross dichroic prism 19.

In the first and third embodiments, the second color light (green light R2) and the third color light (red light R3) are incident on the second polarization separation element (the wavelength selective PBS 12 or the third PBS 72), and the first color light (blue light R1) is incident on the first polarization separation element (the first PBS 11). In other words, color lights other than the blue light R1 do not enter the optical path for blue light (light in a blue wavelength band) following the first color separation element (the dichroic mirror 8).

Blue light has higher absorptance in optical elements than green light and red light. For this reason, the configuration in which only blue light enters the second polarization separation element can prevent light (heat) from being absorbed in the second polarization separation element more than a configuration in which blue light and other color lights enter the second polarization separation element. This prevents a decrease in the performance of the second polarization separation element as a PBS due to photoelasticity. The first color light may be light in a blue wavelength band.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-179326, filed Sep. 3, 2014, which is hereby incorporated by reference herein in its entirety.

What is claimed is:

1. A color separating and combining system that guides a first color light, a second color light, and a third color light having different wavelengths from each other to different optical paths from each other and combines the color lights, the system comprising:
    a light combining element that combines the first color light, the second color light, and the third color light;
    a first color separation element that guides the first color light to a direction different from directions of the second color light and the third color light;
    a first polarization separation element that guides the first color light from the first color separation element to a first light modulating element and guides the first color light modulated by the first light modulating element to the light combining element;
    a second polarization separation element that guides, of the second color light and the third color light from the first color separation element, the second color light to a second light modulating element, guides the third color light to a direction different from a direction of the second light modulating element, and guides the second color light modulated by the second light modulating element to the light combining element;
    a third polarization separation element that guides the third color light from the second polarization separation element to a third light modulating element and guides the third color light modulated by the third light modulating element to the light combining element; and
    a second color separation element that transmits the second color light from the second polarization separation element and reflects the third color light,
    wherein the first light modulating element, the second light modulating element, and the third light modulating element are reflective liquid crystal panels, and
    the second color separation element is disposed between the second polarization separation element and the light combining element, and wherein $\lambda 1 > \lambda 2$ [nm] is satisfied, where $\lambda 1$ is a wavelength of a light whose transmittance in the second polarization separation element becomes half, and $\lambda 2$ is a wavelength of a light whose transmittance in the second color separation element becomes half.

2. The color separating and combining system according to claim 1, wherein:
    the first color light is a light in a blue wavelength band.

3. The color separating and combining system according to claim 1, wherein:
    two color lights with different wavelengths from each other enter the second polarization separation element.

4. The color separating and combining system according to claim 3, wherein:
    the two color lights polarize in different directions from each other, and
    the second polarization separation element transmits one of a P-polarized light and an S-polarized light and reflects another regardless of wavelengths of the two color lights.

5. The color separating and combining system according to claim 4, further comprising:

a first phase plate that converts a polarizing direction of one of the two color lights and keeps a polarizing direction of another; and a second phase plate that converts a polarizing direction of color light from the second polarization separation element, wherein the first phase plate is disposed between the first color separation element and the second polarization separation element, and the second phase plate is disposed between the second polarization separation element and the third polarization separation element.

6. The color separating and combining system according to claim 3, wherein:

the two color lights polarize in a same direction, and the second polarization separation element transmits one of the two color lights and reflects another based on the wavelengths of the two color lights, and transmits one of a P-polarized light and an S-polarized light and reflects another.

7. The color separating and combining system according to claim 1, further comprising:

a first polarizer disposed between the first color separation element and the first polarization separation element.

8. The color separating and combining system according to claim 1, further comprising:

a second polarizer disposed between the first color separation element and the second polarization separation element.

9. The color separating and combining system according to claim 1, further comprising:

a third phase plate that converts a polarizing direction of the first color light from the first polarization separation element; and a fourth phase plate that converts a polarizing direction of the third color light from the third polarization separation element, wherein the third phase plate is disposed between the first polarization separation element and the light combining element, and the fourth phase plate is disposed between the third polarization separation element and the light combining element.

10. A projecting display apparatus comprising:

a light source unit that emits a light including a first color light, a second color light, and a third color light having different wavelengths from each other;

an illumination optical system that receives the light from the light source unit;

a color separating and combining system that guides the first color light, the second color light, and the third color light from the illumination optical system to different optical paths from each other and combines the color lights;

a first light modulating element;

a second light modulating element; and a third light modulating element, wherein the color separating and combining system includes:

a light combining element that combines the first color light, the second color light, and the third color light;

a first color separation element that guides the first color light to a direction different from directions of the second color light and the third color light;

a first polarization separation element that guides the first color light from the first color separation element to the first light modulating element and guides the first color light modulated by the first light modulating element to the light combining element;

a second polarization separation element that guides, of the second color light and the third color light from the first color separation element, the second color light to the second light modulating element, guides the third color light to a direction different from a direction of the second light modulating element, and guides the second color light modulated by the second light modulating element to the light combining element;

a third polarization separation element that guides the third color light from the second polarization separation element to the third light modulating element and guides the third color light modulated by the third light modulating element to the light combining element; and a second color separation element that transmits the second color light from the second polarization separation element and reflects the third color light, wherein the first light modulating element, the second light modulating element, and the third light modulating element are reflective liquid crystal panels, and the second color separation element is disposed between the second polarization separation element and the light combining element, and wherein $\lambda 1 > \lambda 2$ [nm] is satisfied, where $\lambda 1$ is a wavelength of a light whose transmittance in the second polarization separation element becomes half, and $\lambda 2$ is a wavelength of a light whose transmittance in the second color separation element becomes half.

11. The color separating and combining system according to claim 1, wherein the color separating and combining system is configured to receive a light including the first color light, the second color light and the third color light from a light source unit via an illumination optical system, wherein the illumination optical system includes a first fly-eye lens and a second fly-eye lens, and wherein the at least one lens having positive power is different from the first fly-eye lens and second fly-eye lens.

12. The projecting display apparatus according to claim 10, wherein the color separating and combining system is configured to receive the light including the first color light, the second color light and the third color light from the light source unit via the illumination optical system, wherein the illumination optical system includes a first fly-eye lens and a second fly-eye lens, and wherein the at least one lens having positive power is different from the first fly-eye lens and second fly-eye lens.

13. The color separating and combining system according to claim 1, further comprising:

a relay optical system that operates to receive the third color light from the second polarization separation element, wherein the relay optical system is disposed between the second polarization separation element and the third polarization separation element.

14. The color separating and combining system according to claim 13, wherein:

the relay optical system includes at least one lens having positive power and a mirror that reflects the third color light.

15. The projecting display apparatus according to claim 10, further comprising:
a relay optical system that operates to receive the third color light from the second polarization separation element,
wherein the relay optical system is disposed between the second polarization separation element and the third polarization separation element.

16. The projecting display apparatus according to claim 15, wherein:
the relay optical system includes at least one lens having positive power and a mirror that reflects the third color light.

* * * * *